US011325575B2

(12) United States Patent
Wallbaum et al.

(10) Patent No.: US 11,325,575 B2
(45) Date of Patent: May 10, 2022

(54) BRAKE VALVE, COMPRESSED-AIR BRAKE SYSTEM HAVING THE BRAKE VALVE, AND METHOD FOR PRODUCING THE BRAKE VALVE

(71) Applicant: WABCO GmbH, Hannover (DE)

(72) Inventors: Torsten Wallbaum, Duingen (DE); Malte Berroth, Berlin (DE); Arnd Gaulke, Wennigsen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 128 days.

(21) Appl. No.: 16/755,885

(22) PCT Filed: Sep. 6, 2018

(86) PCT No.: PCT/EP2018/073995
§ 371 (c)(1),
(2) Date: Apr. 14, 2020

(87) PCT Pub. No.: WO2019/076534
PCT Pub. Date: Apr. 25, 2019

(65) Prior Publication Data
US 2021/0206362 A1 Jul. 8, 2021

(30) Foreign Application Priority Data

Oct. 17, 2017 (DE) .................... 10 2017 009 654.6

(51) Int. Cl.
*B60T 13/68* (2006.01)
*B60T 8/32* (2006.01)
*B60T 15/14* (2006.01)

(52) U.S. Cl.
CPC ............ *B60T 13/683* (2013.01); *B60T 8/327* (2013.01); *B60T 15/14* (2013.01); *B60T 2270/10* (2013.01); *B60T 2270/413* (2013.01)

(58) Field of Classification Search
CPC ........ B60T 7/042; B60T 8/3255; B60T 8/327; B60T 13/683; B60T 15/14; B60T 2240/04
See application file for complete search history.

(56) References Cited

U.S. PATENT DOCUMENTS 9,421,961 B2 * 8/2016 Schreiter ................. B60T 17/22
10,807,581 B2 * 10/2020 Gaulke ................... B60T 15/14
(Continued)

FOREIGN PATENT DOCUMENTS

| CN | 101722942 A | * | 6/2010 |
|---|---|---|---|
| DE | 102012003106 B3 | | 3/2013 |
| WO | WO 2009152981 A1 | | 12/2009 |

*Primary Examiner* — Thomas J Williams
(74) *Attorney, Agent, or Firm* — Leydig, Voit & Mayer, Ltd.

(57) ABSTRACT

A brake valve for a compressed air brake system of a utility vehicle includes a compressed air input configured to connect to a system pressure, a compressed air output configured to connect a brake control line, and at least one sensor configured to determine a brake valve actuation travel of an actuating element of the brake valve with a working interconnection to the brake pedal. The brake valve further includes a characteristic curve memory storing two stored characteristic curves and/or dependences and at least one determination device. The brake valve is configured to output at least two useful sensor signals, a first of which represents a brake valve output pressure and a second of which represents a percentage actuation position of the actuating element. The at least one sensor is configured to generate an actuating signal depending on the brake valve actuation travel of the actuating element.

17 Claims, 6 Drawing Sheets (56) References Cited

U.S. PATENT DOCUMENTS

| | | | |
|---|---|---|---|
| 2004/0155523 A1* | 8/2004 | Frentz | B60T 8/326 |
| | | | 303/155 |
| 2004/0187625 A1* | 9/2004 | Schiel | B60T 7/042 |
| | | | 74/514 |
| 2005/0173980 A1* | 8/2005 | Bohm | B60T 8/3255 |
| | | | 303/155 |
| 2011/0125381 A1 | 5/2011 | Széll | |
| 2015/0046056 A1 | 2/2015 | Schreiter | |

* cited by examiner

BRAKE VALVE, COMPRESSED-AIR BRAKE SYSTEM HAVING THE BRAKE VALVE, AND METHOD FOR PRODUCING THE BRAKE VALVE

CROSS REFERENCE TO RELATED APPLICATIONS

This application is a U.S. National Phase application under 35 U.S.C. § 371 of International Application No. PCT/EP2018/073995 (WO 2019/076534 A1), filed on Sep. 6, 2018, and claims benefit to German Patent Application No. DE 10 2017 009 654.6, filed Oct. 17, 2017.

FIELD

The invention relates to a brake valve, a compressed air brake system with the brake valve, and a method for the manufacture or calibration of the brake valve.

BACKGROUND

In the case of compressed air brake systems for commercial vehicles, different systems are known for forwarding a braking requirement entered by the driver via his brake pedal to the wheel brakes. In the case of analog compressed air brake systems, a brake valve is operated by means of an actuating element, for example, an actuating rod displaced by the brake pedal, wherein the brake valve is connected to a supply pressure or system pressure and, depending on the actuation, forwards an analog brake valve output pressure via a brake pressure control line to a brake circuit of the compressed air brake system. Thus, an analog brake valve output pressure is generated directly by the brake pedal actuation and is then passed on to the wheel brakes, for example via relay valves for volume boosting and an ABS valve device of an anti-lock brake system. Such systems are characterized by high reliability. In addition, the brake valve output pressure controlled by the brake valve can be measured by a pressure sensor, so that, for example, the brake pressure (pre-control pressure) applied to the ABS valve device is known and the clocking of the ABS shut-off valves can be carried out in the knowledge of the applied brake pressure.

Furthermore, driver assistance systems, such as for example an ACC (automatic cruise control) for distance control to one or more vehicles ahead, as well as systems for the prevention or reduction of the severity of rear-end collisions by automatic braking intervention (AEBS), are known that as external systems output a so-called external brake request signal or XBR signal to a brake control device of the compressed air brake system; but also the brake control device itself can output internal brake system control signals to activate the wheel brakes, in particular for electronic stability programs to prevent vehicle instability (ESP, ESC) by automatic, selective braking interventions (RSC braking). An external XBR signal or a brake signal internal to the brake system requires braking on suitable wheel brakes without the driver operating the brake pedal. For such external braking (XBR braking) or internal (RSC) braking, a system pressure or supply pressure is connected to a brake line via a connection valve device and, for example, is clocked or pulsed to the wheel brakes by the ABS valve device in order to create an appropriate braking effect.

Knowledge of the brake pressure or brake valve output pressure applied due to driver braking is also helpful for such driver assistance systems or their support on the brake system side, so that sufficient control accuracy can be achieved, among other things, during braking and abrupt transitions from the previously applied brake valve output pressure can be avoided during switching operations.

In addition to analog compressed air brake systems, electronic compressed air brake systems are also known, in which the pedal actuation of the brake pedal is sensed electrically by a brake transducer or sensor, without—as with a brake valve—thereby passing an analog brake pressure control value via a connected pneumatic channel to the wheel brakes. In such non-analog, electronic brake systems, a braking effect on the wheel brakes is thus generated directly from a system pressure, wherein a useful sensor signal of the brake sensor is used as a target deceleration or braking force requirement of the driver for the control of a brake pressure on the wheel brakes. With such electronic brake systems, the connection of external braking request signals (XBR signals) is relatively simple, as they can be used in a way corresponding to a driver's braking requirement to control the brake pressure on the wheel brakes. In the case of electronic brake systems, however, the formation of a pneumatic fallback level is sometimes necessary for safety reasons.

DE 10 2012 003 106 B3 describes a method for determining a brake pressure value based on characteristic curves in which an electrical sensor is assigned to an electrical channel of the brake valve or brake encoder and generates electrical signals depending on the actuation of the brake encoder that represent the actuation carried out. Here, a first characteristic curve is first determined and stored, in which the dependence of the electrical signals output by the electrical sensor on the degree of actuation of the brake encoder is shown, and further a second characteristic curve that represents the dependence of the brake pressure value output by the pneumatic channel on the electrical signals of the electrical sensor. In the case of a braking requirement due to actuating the brake encoder, the corresponding brake pressure value can be determined based on the characteristic curves.

In such a system, without the use of a brake pressure sensor, the brake pedal actuation may be assessed based on the characteristic curves stored in the brake control device as a requirement for a specific brake pressure in order to control appropriate braking. By eliminating a brake pressure sensor for determining the ABS pre-pressure, costs can be saved while maintaining a high level of safety.

SUMMARY

In an embodiment, the present invention provides a brake valve for a compressed air brake system of a utility vehicle. The brake valve can be actuated by a brake pedal and is provided for the output of an analog brake valve output pressure and of useful electrical sensor signals depending on the actuation of the brake pedal. The brake valve includes a compressed air input configured to connect to a system pressure, a compressed air output configured to connect a brake control line, and at least one sensor configured to determine a brake valve actuation travel of an actuating element of the brake valve with a working interconnection to the brake pedal. The brake valve further includes a characteristic curve memory storing two stored characteristic curves and/or dependences and at least one determination device. The brake valve is configured to output at least two useful sensor signals, a first of which represents a brake valve output pressure and a second of which represents a percentage actuation position of the actuating element. The at least one sensor is configured to generate an actuating signal depending on the brake valve actuation travel of the actuating element. The at least one determination device is configured to generate the at least two useful sensor signals from the at least one actuating signal depending on the at least two characteristic curves and/or dependences stored in the characteristic curve memory.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure describes brake valves for a compressed air brake system, compressed air brake systems, and methods for the manufacture of brake valves, which allow the formation of a safe compressed air brake system with low manufacturing or maintenance costs.

According to the disclosure, a characteristic curve memory device is provided in a brake valve with at least two stored characteristic curves and/or dependences, so that a brake pedal actuation can be evaluated or converted by at least one determination device of the brake valve based on at least two characteristic curves or dependences. The mechanical brake pedal actuation by the driver thus preferably causes a brake valve actuation travel by moving an actuating element, for example an actuation rod, which is measured by at least one sensor which generates an electrical actuating signal depending on the actuation. The sensor may, for example, be a travel sensor or a Hall sensor, which generates an electrical signal that reflects the brake valve actuation travel of the actuating element.

The actuating signal(s) thus directly determined is/are not output directly as useful sensor signal(s) to a brake control device of a compressed air brake system for further processing, but is/are processed or converted by means of the at least one determination device and the at least two stored characteristic curves, wherein the at least two characteristic curves contain a pressure dependence of the brake valve previously determined in a pressure-oriented calibration and a position dependence of the brake valve determined in a travel-oriented calibration.

Pressure dependence is understood here to be a dependence between the displacement of the actuating element of the brake valve, i.e. the brake valve actuation travel, and the resulting brake valve output pressure that is thus controlled by the brake valve and is fed to the wheel brakes via a brake valve control line. The position dependence, on the other hand, characterizes the relationship between a percentage actuation position of the actuating element of the brake valve, for example no actuation of the actuating element (0%) and full actuation of the actuation element (100%), and the brake valve actuation travel caused in each case, which is indirectly specified by actuating the brake valve by means of a mechanical transmission. Thus, a pressure-travel dependence and a position-travel dependence are used.

Thus, two useful sensor signals can be output mutually independently, each of which has different assigned characteristic curves and each of which takes into account the specific behavior of exactly this brake valve, for example its spring stiffnesses, the actual passage cross-sections for the compressed air depending on the actuation, etc. In this case, the useful sensor signals differ from each other, i.e. a first useful sensor signal indicates the pressure dependence and a second useful sensor signal indicates the position dependence of the brake valve, so that the controlled brake valve output pressure can be determined from the first useful sensor signal when the brake pedal is operated and the percentage actuation position of the actuating element that is indirectly set by the driver by means of the pedal can be determined from the second useful sensor signal.

Thus, different stored characteristic curves and/or dependences (pressure dependence, position dependence) with which the respective useful sensor signal is obtained from the actuating signal, are assigned to each useful sensor signal. Thus, on the one hand, sufficient signal redundancy can be produced and, depending on the application, different variables (pressure/position) can be used to evaluate a driver's braking requirement and thus, for example, to more safely carry out braking that is automatically requested at the same time.

Advantageously, the characteristic curves or dependences are already determined during the manufacture of the brake valve, by the actuating element or an actuator traversing indifferent braking valve actuation travels in a calibration process or method, wherein a pneumatic system pressure is connected to the compressed air input of the brake valve, and analog brake valve output pressure values controlled by the brake valve at its pneumatic channel are measured for the different brake valve actuation travels. Thus, a pressure-travel dependence or a pressure-actuating signal dependence is first produced, which reflects or contains the pressure characteristic of the brake valve (pressure-oriented calibration).

For the travel-oriented calibration, the brake valve or the actuating element of the actuator can be displaced to different percentage actuating positions, for example 0% and 100%, and determined by means of the sensor and the actuating signal of the correspondingly assigned brake valve actuation travel, so that a position-travel dependence or position-actuating signal dependence is produced that reflects or contains the position characteristic of the brake valve.

These data or the dependences determined from these measurements are then stored in the characteristic curve memory device of the brake valve as brake valve pressure characteristic curves or brake valve position characteristic curves, which thus individually or specifically reproduce the characteristics of this brake valve. However, the pressure-travel dependences or the position-travel dependences can also be stored in the characteristic curve memory device of the brake valve. In the event of braking, these characteristic curves are then applied to the actuating signal and the useful sensor signals are output depending on the characteristic curve used.

Also identical brake valves may have different characteristic curves or dependences due to production-related tolerances, wherein the characteristic curves can be shifted in particular relative to each other, which can lead to significant deviations in steeper characteristic curve regions. By using at least two characteristic curves already in the brake valve that are calibrated in travel-oriented and pressure-oriented ways, at least two useful electrical sensor signals can thus be output, which are uniform and standardized and are no longer to be further subjected to complex processing by the brake control device, since this processing already takes place in the brake valve. Thus, brake valves can be replaced without further effort, i.e. no changes in the brake control device have to be made. It is also possible to replace the brake valve with a similar device with similar calibration.

The brake valve is the unit that is actuated by the brake pedal or an actuating rod of the brake pedal as the actuating element and, depending on the actuation, on the one hand, a connected system pressure, for example of a compressed air storage tank or a supply storage tank, is controlled as an analog brake valve output pressure and, on the other hand, at least two useful electrical sensor signals are output, which can be received and further processed by the brake control device. Thus, an analog pneumatic channel and two electrical channels emanate from the brake valve, wherein a useful sensor signal is transmitted over each electrical channel, wherein, for example, an electrical control line is provided between the brake valve and the brake control device for this purpose. The useful electrical sensor signals can be transmitted to the brake control device, for example via a data bus (CAN bus) within the vehicle or within the brake system, or for example as a pulse-width modulated useful electrical sensor signal.

A signal width of the pulse-width modulated useful sensor signal can preferably be determined from the respective actuating signal as a proportional variation, in particular a linear variation, by the determination device, so that the brake valve output pressure or the percentage actuation position can be determined from the signal width of the corresponding useful sensor signal in each case from a simple linear relationship, for example by the brake control device, and from this the degree of pedal actuation can be determined indirectly. However, the characteristic curves themselves are not necessarily linear. Thus, the brake valve pressure characteristic curve, i.e. the relationship between the actuating signal and the brake valve output pressure, may be formed, for example, with different gradients indicating a spring stiffness of springs acting on the actuating element. By contrast, the brake valve position characteristic, i.e. the dependence between the actuating signal and the percentage actuation position, is preferably linear but in principle can also have different gradients.

Unlike in DE 10 2012 003 106 B3 for example, the characteristic curve is thus not stored in the brake control device or a connected memory unit, but is already stored in the brake valve itself, which is pneumatically and electrically connected into the compressed air brake system. Thus, the advantage of greater variability and the possibility of the replacement of individual components is achieved without carrying out additional parameterization on the existing brake system; also different brake valves of basically similar construction can be used directly in a brake system without first having to program a memory device of the brake control device accordingly, for example.

Calibration can be carried out in particular during production or at the end of the production of the brake valve during the final leak test and function test. In any case, the brake valve is checked for leaks and pressure characteristics during the final inspection, for example, wherein it is connected to a system pressure with its compressed air input and the leak-tightness of its compressed air input and compressed air output is checked. Subsequently or during this test, the travel-oriented and pressure-oriented calibration can be carried out by, for example, traversing a series of brake valve actuation travels with the actuator and producing and storing the corresponding characteristics and dependences. Thus, a travel-oriented and pressure-oriented calibration of the brake valve is carried out with little effort, individually and specifically for the brake valve, the internal memory device of which can subsequently be programmed with the characteristic curve data for subsequent conversion.

For the generation of the two useful sensor signals, according to an alternative two sensors can be provided, each of which, depending on the brake valve actuation travel, generates an actuating signal and outputs it to a determination device assigned to the respective sensor. Each determination device then outputs a respective useful sensor signal as described above. Each determination device has access to the stored characteristic curves, wherein each determination device preferably accesses different characteristic curves, whereby a different characteristic curve is assigned to each useful sensor signal. This results in redundancy, as different measurement values can be used to detect the driver's operation of the brake pedal, and each measurement value is output by a different sensor. The two useful sensor signals can then be transmitted from the brake valve to the brake control device via the electrical control line in parallel and mutually independently in a standardized manner.

Alternatively, however, only one sensor and one determination device may be provided, wherein the one determination device produces two useful sensor signals from the one actuating signal of the one sensor via the two characteristic curves and/or dependences (pressure, position) and outputs them independently and in parallel with each other.

Figure 1:
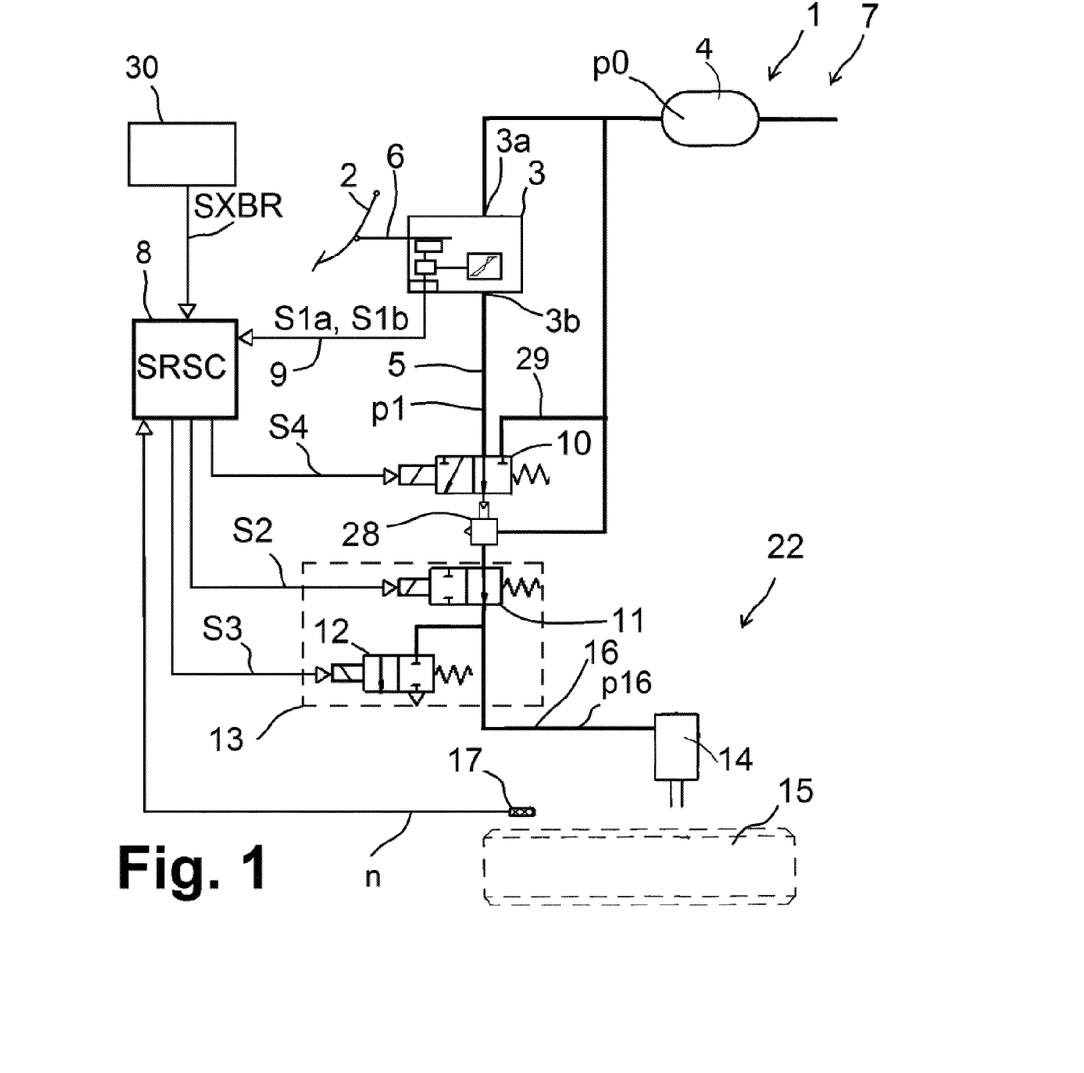
FIG. 1 shows an electropneumatic circuit diagram of a compressed air brake system.

A compressed air brake system 1 of a commercial vehicle 7 is shown in FIG. 1 with a brake circuit 22; in general several brake circuits 22 are provided. The driver operates a brake pedal 2 and thus a brake valve 3, which receives compressed air with a system pressure p0 from a compressed air storage tank 4 via its compressed air input 3*a* and feeds it through its compressed air output 3*b* to a brake pressure control line 5. Thus, depending on the operation of the brake pedal 2 by the driver, an analog brake valve output pressure p1 is placed on the brake pressure control line 5 by the brake valve 3. According to the embodiment shown, the analog brake valve output pressure p1 is fed to the brake circuit 22 via an open supply valve device 10, which is in the form here of a single connection valve 10, namely as a 3/2-way solenoid valve. The connection valve 10 is used to optionally connect a driver assistance function depending on an external brake demand signal SXBR or for example an internal braking requirement signal SRSC, as described below.

In the brake circuit 22, an ABS valve device 13 with an ABS inlet valve 11 and an ABS outlet valve 12 is provided, to which a brake line 16 with a wheel brake 14 provided on a vehicle wheel 15 is subsequently connected. A brake control device 8 (control device of the brake system) receives wheel speed signals n of the wheel speed sensors 17 provided on the vehicle wheels 15 and outputs control signals S2 and S3 as ABS control signals to the ABS valve device 13 for brake slip control, with the phases to maintain, lower or increase the brake pressure p16 in the brake line 16 as is known.

The brake valve 3 thus has the brake pressure control line 5 as a pneumatic output channel. Furthermore, the brake valve 3 has an electrical control line 9 as an electrical output channel, wherein at least two useful sensor signals S1a, S1b can be output from the brake valve 3 to the brake control device 8 via the electrical control line 9. The electrical control line 9 can be designed in any way for this purpose so that the two useful sensor signals S1a, S1b can be transmitted mutually independently to the brake control device 8 via the electrical control line 9. For this purpose, the electrical control line 9 can enable a two-channel data transmission in any way, for example via two wires running in the electrical control line 9 or by a suitable encrypted transmission of the useful sensor signals S1a, S1b via only one wire. Thus, there are two electrical output channels on the brake valve 3.

Figure 2A:
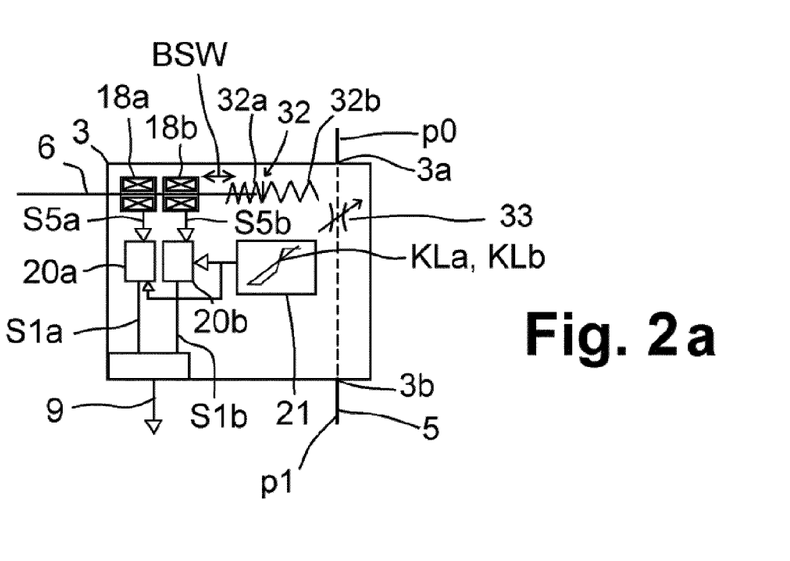
FIG. 2a, 2b shows an enlarged representation of the brake valve from FIG. 1 in two different embodiments.
Figure 2B:
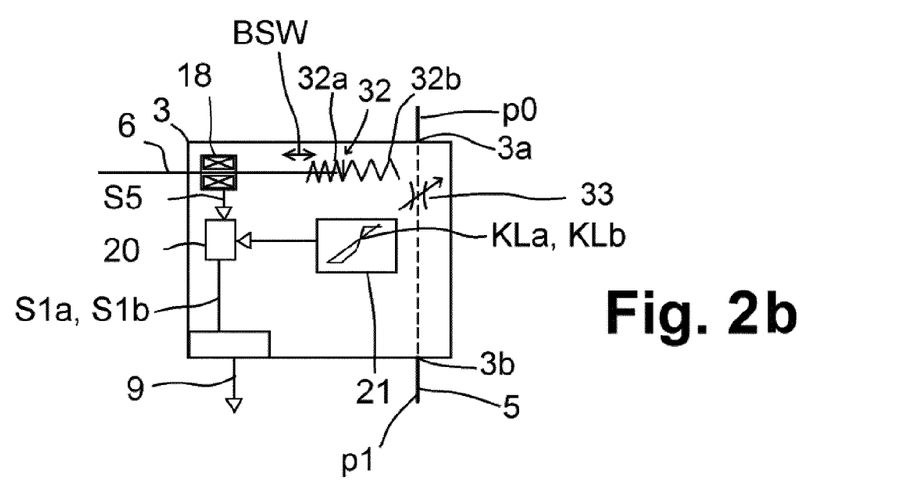

According to the detail enlargement in FIGS. 2a and 2b, the brake valve 3 has an actuating rod 6 as an actuating element or an actuating member that has an active connection to the brake pedal 2 and that is adjustable by a brake valve actuation travel BSW, by which for example a passage cross-section 33 of the brake valve 3 for the output of the analog brake valve output pressure p1 to the brake pressure control line 5 is adjusted—in a known manner.

According to FIG. 2a, two travel sensors 18a, 18b, for example Hall sensors, each for sensing the brake valve actuation travel BSW, are arranged on the actuation rod 6. The two travel sensors 18a, 18b each generate an actuating signal S5a, S5b depending on the brake valve actuation travel B S W and output these to a determination device 20a, 20b assigned to the respective travel sensor 18a, 18b, which based on the characteristic curves KLa, KLb stored in a characteristic curve memory 21 of the brake valve 3 form the first and second useful sensor signals S1a, S1b from the respective actuating signals S5a, S5b, wherein the useful sensor signals S1a, S1b are placed on a CAN bus as a PWM signal or data content for example, and which are output mutually independently via the electrical control line 9 to the brake control device 8. The brake control device 8 can then determine the brake valve output pressure p1 or a percentage actuation position SP of the actuating rod 6 directly from the useful sensor signals S1a, S1b, wherein a first useful sensor signal S1a represents the brake valve output pressure p1 and a second useful sensor signal S1b represents the percentage actuation position SP. The percentage actuation position SP indicates a standardized percentage actuation of the actuating rod 6 as a result of the operation of the brake pedal 2, i.e. no actuation (0%) and full actuation (100%).

According to an alternative embodiment in FIG. 2b, however, only one travel sensor 18 may be provided, the actuating signal S5 of which is output to a common determination device 20, which generates both useful sensor signals S1a, S1b via the characteristic curves KLa, KLb from the one actuating signal S5 and outputs these signals S1a, S1b via the electrical control line 9.

The brake valve output pressure p1 can be fed directly to the wheel brake 14 with the connection valve 10 open and the inlet valve 11 of the ABS valve device 13 open. Furthermore—in a known manner that is not shown here—additional valve devices may be provided, for example for an axle load distribution device (ALB valve device).

For example, an external braking requirement signal SXBR can be output to the brake control device 8 via the CAN bus from an external driver assistance control device 30, whereupon this brake control device 8 outputs a switch-on signal S4 for switching the connection valve 10, which connects the compressed air storage tank 4 for example or even another compressed air storage tank with the system pressure p0 to the brake circuit 22 via a supply line 29 using the ABS valve device 13. The brake control device 8 clocks the ABS valve device 13 with the control signals S2, S3 so that from the system pressure p0 the analog service brake pressure p16 to be set for the driver assistance function is set in the brake line 16 to the wheel brake 14. In addition, an internal braking requirement signal SRSC can be processed in this way, for example for rollover prevention (RSC).

An accurate knowledge of the analog brake valve output pressure p1 in the brake control line 5, which is controlled by the driver via the brake valve 3, is particularly important for ABS control, but also for the initiation of such driver-independent external braking (XBR) or driver-independent internal braking (RSC), since the brake system already uses a relationship between pressure control and vehicle response (deceleration) when braking to achieve an accurate implementation of the braking requirement, which can be derived from driver braking, i.e. braking requirements caused by the driver by means of the brake pedal, and is further switched at the connection valve 10 between the brake valve output pressure p1 and the system pressure p0 and therefore significant pressure differences may be present. The brake control device 8 should therefore take into account the present brake valve output pressure p1, otherwise jerky brake interventions may occur during switching, which may lead to vehicle 7 instabilities.

It is also possible to draw conclusions from the percentage actuation position SP about a braking requirement initiated by the driver via the brake pedal, which can, for example, serve to detect the presence of a driver. This is important for various stopping functions, for example, in order to ensure that the driver may be able to intervene adequately if necessary. Basically, the profile of the percentage actuation position SP can also differ from the profile of the brake valve actuation travel BSW, for example to compensate for further scattering occurring over the service life of the brake valve 3 or the vehicle 7, such as a shift of the null position (percentage position of 0%) of the brake valve 3 as a result of resistances in the pedal box.

For this purpose, the brake control device 8 receives the two useful sensor signals S1a, S1b from the brake valve 3 via the two electrical output channels or the electrical control line 9. Which of the two variables transmitted by means of the useful sensor signals S1a, S1b, i.e. the brake valve output pressure p1 and/or the percentage actuation position SP, is accessed by the brake control device 8 is therefore dependent on the respective application. For example, for ABS control or for RSC braking, only the brake valve output pressure p1 can be used, while to determine whether the driver is operating the brake at all or is in place, additionally or alternatively the percentage actuation position SP can be used. However, both variables p1, SP can also be used simultaneously to form a diversified redundancy, since two different variables p1, SP are used to assess the requested braking, both of which characterize the same thing, namely the braking of the vehicle 7 required by means of the brake pedal 2. This redundancy can be extended further by using two travel sensors 18a, 18b according to FIG. 2a.

The determination and processing of the actuating signal(s) S5; S5a, S5b to form the useful sensor signals S1a, S1b and the use thereof in the brake control device 8 are described below in more detail with reference to the diagrams of FIGS. 3, 4, 5a and 5b, in which respective dependences or characteristic curves are shown of two brake valves 3 that are fundamentally identical, but that are slightly different due to manufacturing-related tolerances, i.e. a first brake valve 3-I and a second brake valve 3-II; correspondingly, the respective dependences or characteristic curves are shown marked by -I and -II.

Figure 3:
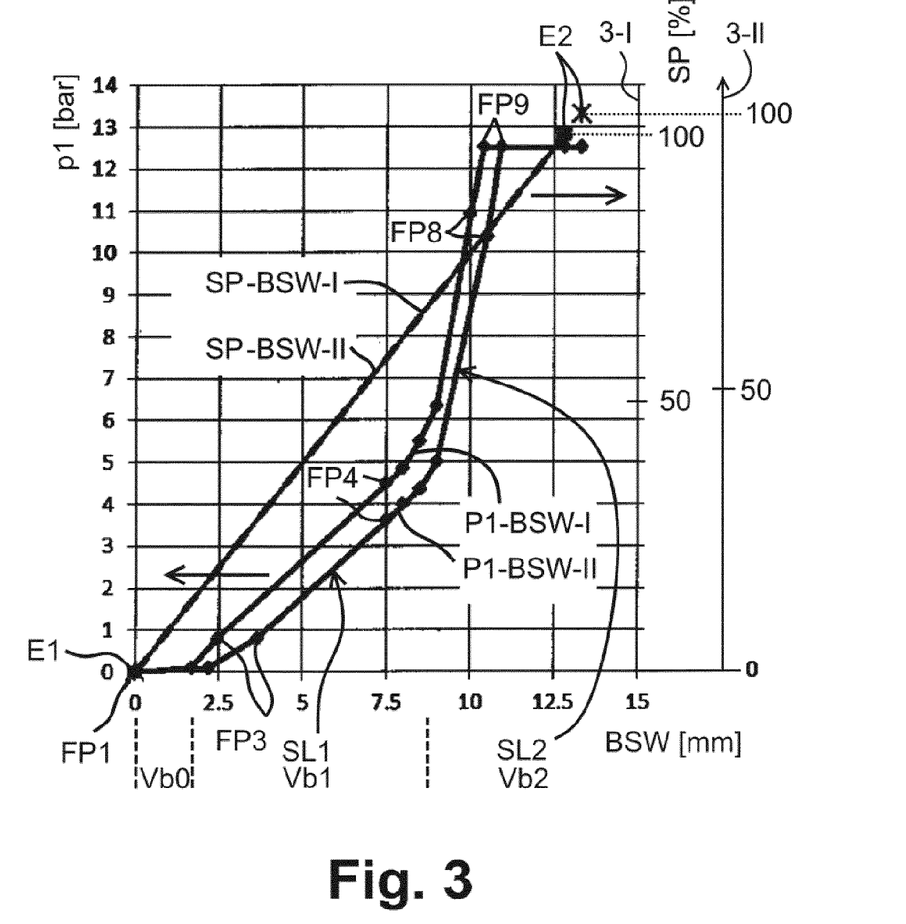
FIG. 3 shows a diagram of a controlled brake valve output pressure and a percentage actuation position as a function of a measured brake valve actuation travel for two brake valves of the same design in the compressed air-brake system of FIG. 1.

In FIG. 3, the brake valve output pressure p1, for example in "bar", as well as the percentage actuation position SP, for example in "%", are shown against the brake valve actuation travel BSW, for example in "mm", indicated by the actuating signal S5; S5a, S5b. This results for each of the brake valves 3-I, 3-II in a pressure-travel dependence P1-BSW, which is shown for the two brake valves 3-I, 3-II as P1-BSW-I and P1-BSW-II, and a position-travel dependence SP-BSW, which is shown for the two brake valves 3-I, 3-II as SP-BSW-I and SP-BSW-II, wherein the two position dependences SP-BSW-I, SP-BSW-II in FIG. 3 are essentially coincident and linear, but differ in the end points E2. Each brake valve 3-I, 3-II in FIG. 3 is assigned a coordinate axis for the percentage position in "%", wherein the respective end points E1, E2 are at an actuation position value SPi of 100%, which corresponds to full actuation of the respective brake valve 3-I, 3-II.

A valve flap in the brake valve 3 for opening the passage cross section 33 is actuated by the actuating rod 6, for example via a spring device 32 with two springs 32a, 32b with different spring characteristics. Due to this specific spring formation, an opening characteristic is defined as a so-called "Feeling curve", in which small operations of the brake pedal 2 and thus also small brake valve actuation travels BSW in an initial adjustment range Vb0 do not initially lead to opening of the valve flap, that is there is a brake valve output pressure p1=0 bar. In a subsequent first adjustment range Vb1, a first spring stiffness SL1 of the first spring 32a becomes relevant as for example the lower first gradient, and subsequently in a second adjustment range Vb2 a second spring stiffness SL2 of the second spring 32b becomes relevant, which is indicated by a second, larger gradient.

Thus, a gradual pressure increase first occurs in the brake valve output pressure p1, and then, with stronger operation, a more significant pressure increase of the brake valve output pressure p1 is enabled. Such "Feeling curves" are perceived as pleasant for a driver.

To define the pressure-travel dependence P1-BSW shown in FIG. 3, fixed points FPi with i=1, 2, 3, . . . are provided as value pairs of a brake valve output pressure value p1i and a brake valve actuation travel value BSWi, between which the respective pressure-travel dependence P1-BSW is interpolated. In FIG. 3, for the sake of clarity only some of the fixed points FPi are marked. The fixed points FPi are used to define characteristic regions of the pressure-travel dependence P1-BSW:

The first fixed point FP1 here is initially at BSW=0 and thus p1=0, corresponding to no brake pedal actuation. The following second fixed point FP2 may be present, for example, at a brake valve actuation travel value BSWi at which a first pressure increase takes place, wherein, for example, there is a brake valve output pressure value p1i of p1 that is less than or equal to 0.1 bar. At the third fixed point FP3 for the corresponding brake valve actuation travel value BSWi, there is a pressure of p1=0.8 bar, for example; subsequently, several fixed points FPi are set at the transition of the linear sections of the spring characteristic curves, so that the pressure-travel dependence P1-BSW is formed by a series of lines or a series of sections with several sections, wherein here for example a longer straight section is specified between FP3 and FP4, then a transition is specified and another straight section of the second spring 32b is specified between FP7 and FPB. At FP9, a full brake actuation is already achieved, so that the further actuation at FP10 does not lead to any further increase in the brake valve output pressure p1. At FP10, maximum operation of the brake pedal 2 is thus achieved, i.e. the brake pedal 2 is fully operated.

The pressure-travel dependence P1-BSW can thus be defined for each of the brake valves 3-I, 3-II, for example, as tuples of fixed points FPi, as value pairs (p1i, BSWi) in each case.

In a corresponding manner, the position-travel dependence SP-BSW is also determined for each of the brake valves 3-I, 3-II, wherein a linear dependence is assumed for this according to FIG. 3, so that for each position-travel dependence SP-BSW-I, SP-BSW-II only two travel points Ei, with i=1, 2, which can be the endpoints, for example, are sufficient for definition. Thus, in FIG. 3, a first travel point E1 is formed for both position-travel dependences SP-BSW-I, SP-BSW-II by the value pair (BSWi, SPi)=(0,0) and a second distance point E2 for the respective brake valve 3-I, 3-II is formed by (BSWi, SPi)=(13 mm, 100%) or (BSWi, SPi)=(13.5 mm, 100%). However, several travel points Ei may also be provided to define non-linear behavior between the brake valve actuation travel BSW and the percentage actuation position SP.

Figure 4:
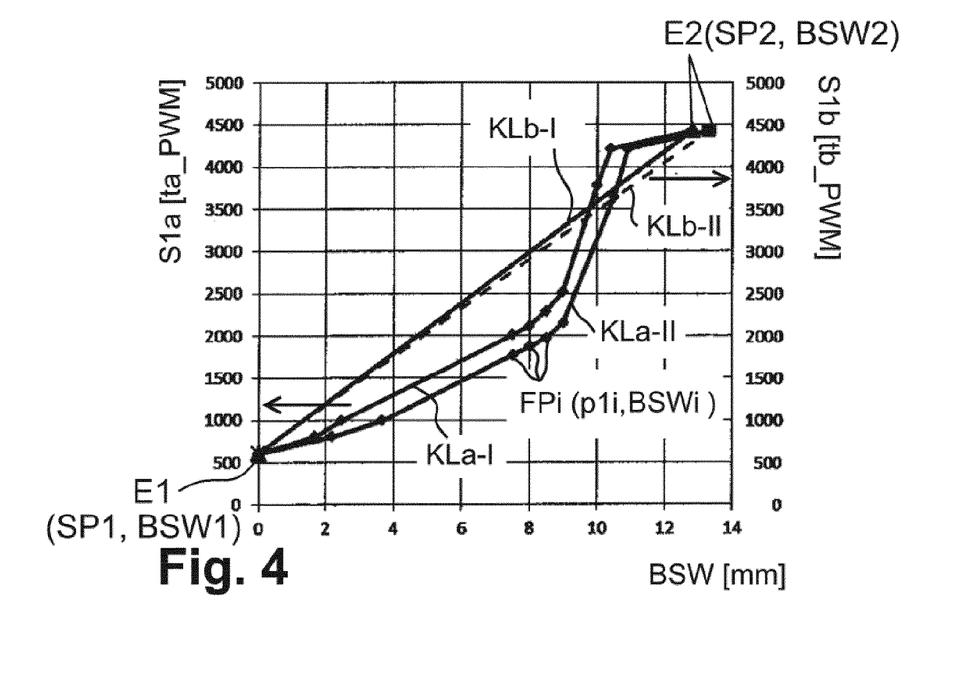
FIG. 4 shows a diagram of useful sensor signals of the two brake valves as a function of the brake valve actuation travel.

FIG. 4 shows the brake valve pressure characteristic curves KLa used by the determination device(s) 20; 20a, 20b, i.e. again the two brake valve-pressure characteristic curves KLa-I and KLa-II for the two identical brake valves 3, or the brake valve-position characteristic curves KLb, i.e. again the two brake valve-position characteristic curves KLb-I and KLb-II for the two identical brake valves 3. The brake valve pressure characteristic curve KLa assigns a first useful sensor signal S1a, which is output as a PWM signal with a first signal width ta_PWM or via a CAN bus and which represents the controlled brake valve output pressure p1, to the brake valve actuation travel BSW of the corresponding brake valve 3 received via the respective actuating signal S5; S5a. The brake valve position characteristic curve KLb assigns a second useful sensor signal S1b, which is output as a PWM signal with a second signal width tb_PWM or via a CAN bus, and which represents the percentage actuation position SP, to the brake valve actuation travel BSW of the respective brake valve 3 received via the respective actuating signal S5; S5b.

The respective mentioned characteristic curves KLa, KLb can be stored in the memory device 21; in principle, however, the pressure-travel dependences P1-BSW or the position-travel dependences SP-BSW for the respective brake valve 3 may also be stored in the memory device 21, so that the respective determination device 20; 20a, 20b determines the respective useful sensor signal S1a, S1b on the basis thereof; it is relevant that the determination device 20; 20a, 20b generates and outputs the respective useful sensor signal S1a, S1b.

When the brake pedal 2 is operated, an actuating signal S5; S5a, S5b is thus first generated in the brake valve 3 by the respective travel sensor 18; 18a, 18b, from which the respective useful sensor signal S1a, S1b is then determined by the respective determination device 20; 20a, 20b based on the stored characteristic curves KLa, KLb (or P1-BSW or SP-BSW) and is output to the brake control device 8 for further processing.

Figure 5A:
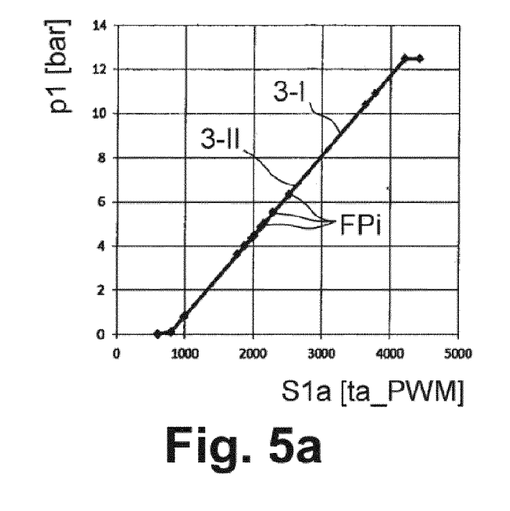
FIG. 5a shows a diagram with the dependences derived from FIGS. 3 and 4 of the brake valve output pressure on a first useful sensor signal for the two brake valves.
Figure 5B:
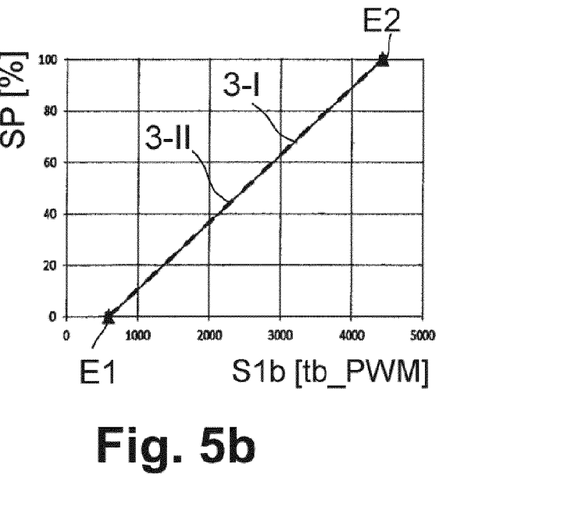
FIG. 5b shows a diagram with the dependences derived from FIGS. 3 and 4 of the percentage actuation position of a second useful sensor signal for the two brake valves.

According to FIG. 5a, 5b, the respective useful sensor signal S1a, S1b with the respective signal width ta_PWM, tb_PWM for both brake valves 3-I and 3-II is shown in a linear dependence, wherein the functions p1(S1a) in FIG. 5a or SP (S1b) in FIG. 5b (with the percentage standardized actuation position SP) cover each other, i.e. are identical in each case, even if the fixed points FPi of the dependences P1-BSW-I, P1-BSW-II or the travel points Ei of the dependences SP-BSW-I and SP-BSW-II and accordingly KLa-I and KLa-II and KLb-I and KLb-II are partially different. Thus, a uniform, identical useful sensor signal S1a, S1b can be used by the brake control device 8 for each brake valve 3 that is used; the specific tolerances and inequalities can thus already be taken into account and compensated by the stored characteristic curves KLa, KLb in the brake valve 3 and no longer have to be detected and included by the brake control device 8. The replacement of a brake valve 3 without reprogramming the brake control device 8 also leads to no change in the brake behavior.

Figure 6A:
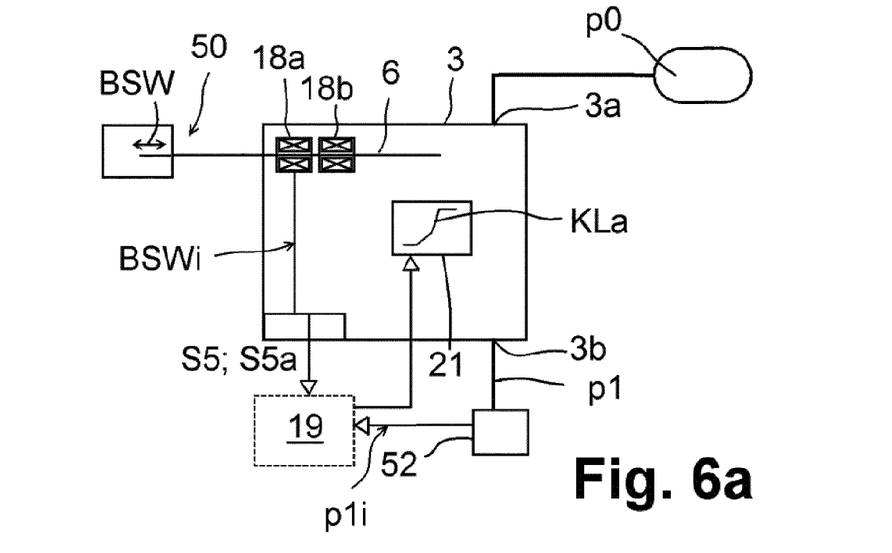
FIGS. 6a, 6b show arrangements for calibrating a brake valve in accordance with FIGS. 2a, 2b in two different versions.
Figure 6B:
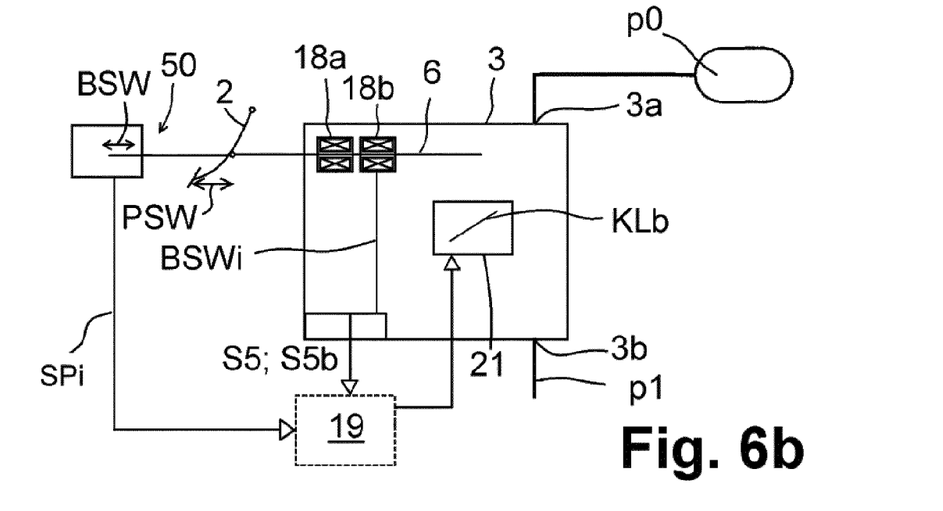

The characteristic curves KLa, KLb (or P1-BSW and SP-BSW) are determined according to FIGS. 6a, 6b in a calibration process or calibration method that is already carried out during production of the respective brake valve 3, in particular at the end-of-line during a final test. During the final test, the brake valves 3 are first subjected to a leak test, etc. in the usual way, for which they are connected with their compressed air input 3a to a storage pressure p0 and with their compressed air output 3b to a pressure sensor 52 in accordance with FIG. 6a, 6b.

Furthermore, for pressure-oriented calibration according to FIG. 6a an actuator 50 is used, which simulates how the actuating rod 6 is displaced during the operation of the brake valve 3, wherein the actuating signal(s) S5; S5a produced by the corresponding travel sensor 18; 18a can be received by a measurement device control device 19, for example. In this case, the fixed points FP1 through FP10 of FIG. 3 are traversed by the brake valve actuation travel BSW that results from the actuating signals S5; S5a, and the controlled brake valve output pressure p1 is measured by the pressure sensor 52 and assigned to the brake valve actuation travel BSW in the measurement device control device 19, so that the corresponding pairs of values are generated from the brake valve actuation travel values BSWi and the brake valve output pressure values p1i.

In the same way, according to FIG. 6b a brake valve actuation travel BSW, which corresponds to a certain percentage actuation position SP, is directly adjusted with the actuator 50 and depending thereon the brake valve actuation travel BSW can be determined by the corresponding travel sensor 18;18b or by means of the respective actuating signal S5; S5b, so that a travel-oriented calibration can also be carried out in the measurement device control device 19, during which the travel points Ei are traversed and from which the value pairs are generated from the brake valve actuation travel values BSWi and the actuating position values SPi. The brake valve actuation travel BSW is correlated with a pedal actuation travel PSW for the brake pedal depending on the behavior of the brake pedal 2 or the pedal box.

Thus, in such a calibration method, the pressure-travel dependence P1-BSW or the brake valve pressure characteristic curve KLa or the position-travel dependence SP-BSW or the brake valve position characteristic curve KLb can be determined directly and stored in the memory unit 21 in a non-volatile manner, so that in operation the characteristic curve KLa, KLb that applies to the corresponding brake valve 3 can be used. As a result, pressure-oriented or travel-oriented calibration of the brake valve 3 is carried out.

Figure 7:
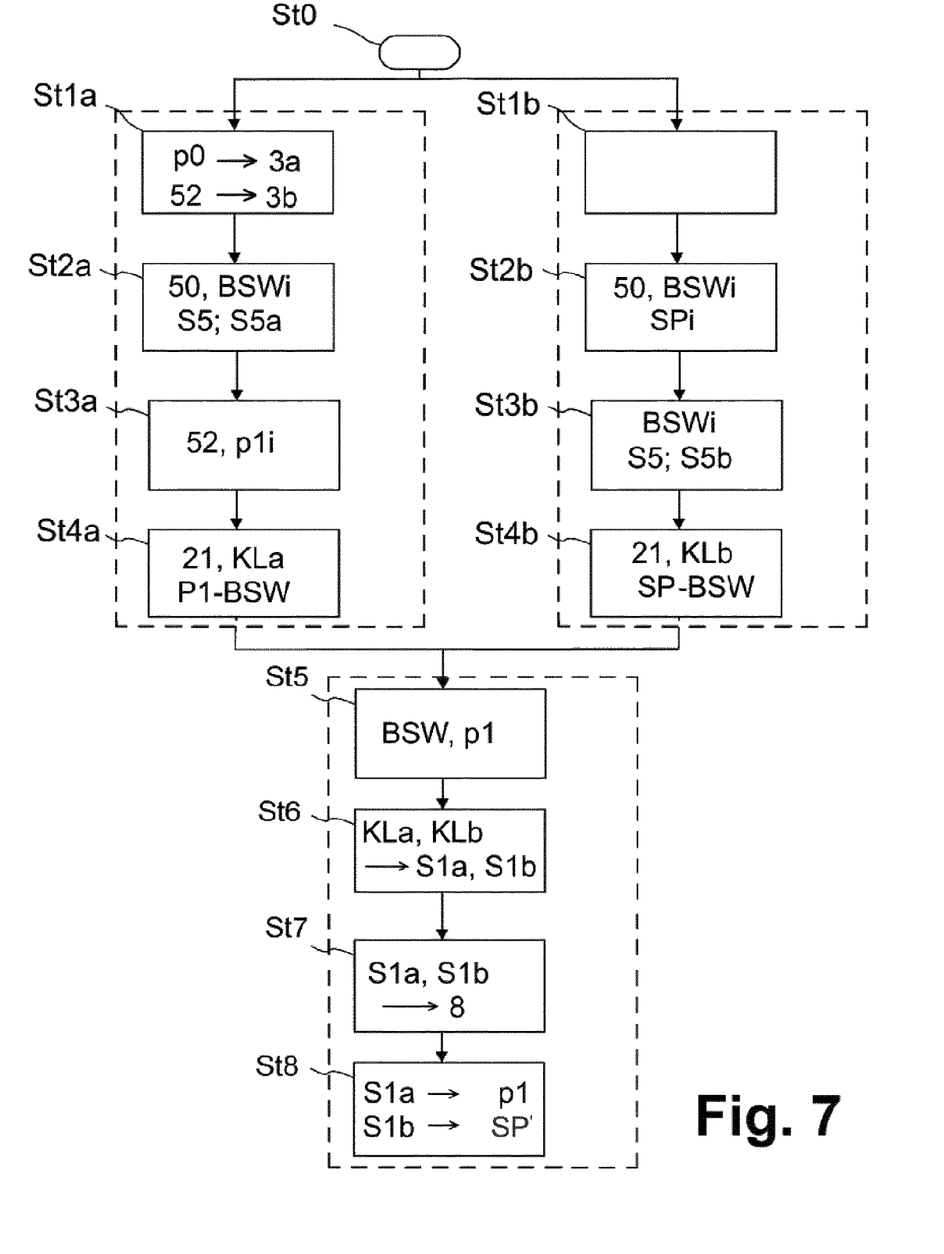
FIG. 7 shows a flowchart of a calibration method according to an embodiment.

Thus, in the manufacturing process of FIG. 7 after the start in step St0, then according to step St1a the storage tank 4 or a system pressure p0 is connected to the compressed air input 3a of the brake valve 3, and the pressure sensor 52 is connected to the compressed air output 3b; this step can be part of the previous leak test. Subsequently, in step St2a, the actuator 50 is activated and thus different brake valve actuation travels BSW are set (see FIG. 6a), each of which is measured as an actuating signal S5; S5a, wherein accordingly the fixed points FPi are successively traversed. In step St3a—simultaneously with step St2a—in each case for the correspondingly set brake valve actuation travel values BSWi the respective pressure value p1i is measured by the pressure sensor 52, wherein these measured values are recorded by the measurement device control device 19, and subsequently in step St4a the brake valve pressure characteristic curve KLa or the pressure-travel dependence P1-BSW is formed as a value tuple of the fixed points FPi, for example, and stored in the memory device 21.

For the travel-oriented calibration (see FIG. 6b), which precedes or follows steps St1a to St4a, it is provided in a step St1b to connect the actuator rod 6 of the brake valve 3 to the actuator 50. In a step St2b, the actuator 50, which acts on the actuator rod 6 of the brake valve 3, is activated and as a result various brake valve actuation travels BSW are set, which correspond to a certain percentage actuation position SP, wherein the travel points Ei are traversed according to FIG. 3 and these are assigned, for example, to a non-activated state of the brake valve 3 (percentage actuation position value SP1=0%) and a fully operated state of the brake valve 3 (percentage actuation position value SP2=100%). In a step St3b simultaneous with step St2b— the brake valve actuation travels BSW are each measured by the corresponding travel sensors 18; 18b by means of the actuating signal S5; S5b. These measured values are received by the measurement device control device 19 and subsequently in step St4b the brake valve position characteristic curve KLb or the position-travel dependence SP-BSW is formed and stored in the memory device 21 as a value tuple of the travel points Ei.

The calibration process in the brake valve pressure characteristic curve KLa or in the brake valve position characteristic curve KLb is thus carried out in step St1a through St4a or St1b through St4b once during production and calibration of the brake valve 3. In principle, it can be renewed afterwards; however, this is not necessary.

Thus, after manufacture and calibration, in operation, when the brake valve 3 is actuated, for example by means of the brake pedal 2 by the pedal actuation travel PSW: according to step St5, on the one hand the analog brake valve output pressure p1 is fed through and furthermore a brake valve actuation travel BSW is determined as the actuating signal S5; S5a, S5b; according to step St6, the two useful sensor signals S1a, S1b are determined by the respective determination device 20; 20a, 20b based on the brake valve actuation travel BSW using the respective characteristic curve KLa, KLb or the respective dependence P1-BSW, SP-BSW; in step St7 the useful sensor signals S1a, S1b are output to the brake control device 8; wherein subsequently in step St8 the brake control device 8 obtains the brake valve output pressure p1 or the percentage actuation position SP directly and linearly from the two useful sensor signals S1a, S1b and can use the same to output the control signals S2, S3 and possibly S4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

1 compressed air brake system
2 brake pedal
3 (-I,-II) brake valve (first/second)
3a compressed air input
3b compressed air output
4 compressed air storage tank
5 brake pressure control line
6 actuating rod of the brake valve 3
7 vehicle, in particular commercial vehicle
8 brake control device (control device of the brake system)
9 electrical control line
10 connection valve
11 ABS inlet valve
12 ABS outlet valve
13 ABS valve device
14 wheel brake
15 vehicle wheel
16 brake line
17 wheel speed sensor
18 travel sensor
18a first travel sensor
18b second travel sensor
19 measurement device control device
20 determination device
20a first determination device
20b second determination device
21 characteristic curve memory
22 brake circuit
28 relay valve
29 supply line
30 external driver assistance control device
32 spring device in the brake valve 3
32a first spring
32b second spring
33 passage cross-section
50 actuator
52 pressure sensor
BSW brake valve actuation travel
BSWi Brake valve actuation travel values
Ei travel points
FPi fixed points as number tuples from BSWi and p1i
i index
KLa brake valve pressure characteristic curve
KLa-I first brake valve pressure characteristic curve
KLa-II second brake valve pressure characteristic curve
KLb brake valve position characteristic curve
KLb-I first brake valve position characteristic curve
KLb-II second brake valve position characteristic curve
n wheel speed signal
p0 system pressure
p1 analog brake valve output pressure in the brake control line 5
P1-BSW pressure-travel dependence
P1-BSW-I first pressure-travel dependence
P1-BSW-II second pressure-travel dependence
p1i brake valve output pressure value
p16 analog service brake pressure in the brake line 16
PSW pedal operation travel
S1a first useful sensor signal
S1b second useful sensor signal
S2, S3 control signals to the ABS shut-off valves 11, 12
S4 connection signal
S5 actuating signal
S5a first actuating signal
S5b second actuating signal
SL1 first spring stiffness as first gradient
SL2 second spring stiffness as second gradient
SRSC internal, driver-independent brake request signal (Roll Stability Control)
SP percentage actuation position
SPi actuation position value
SP-BSW position-travel dependence
SP-BSW-I first position-travel dependence
SP-BSW-II second position-travel dependence
SXBR external brake request signal (eXternal Brake Request)
ta_PMW first signal width
tb_PMW second signal width
Vb0 starting adjustment range
Vb1 first adjustment range
Vb2 second adjustment range
St0-St8 steps of the method, wherein
St1a-St4a steps of the calibration method of the brake valve pressure characteristic curve KLa,
St1b-St4b steps of the calibration method of the brake valve position characteristic curve KLb
St5-St8 steps of the braking procedure

The invention claimed is:

1. A brake valve for a compressed air brake system of a utility vehicle, wherein the brake valve can be actuated by a brake pedal and is provided for the output of an analog brake valve output pressure and of useful electrical sensor signals depending on the actuation of the brake pedal, the brake valve comprising:
- a compressed air input configured to connect to a system pressure;
- a compressed air output configured to connect a brake control line; and
- at least one sensor configured to determine a brake valve actuation travel of an actuating element of the brake valve with a working interconnection to the brake pedal;
- a characteristic curve memory storing two stored characteristic curves and/or dependences; and
- at least one determination device,
- wherein the brake valve is configured to output at least two useful sensor signals,
- wherein a first useful sensor signal represents a brake valve output pressure and a second useful sensor signal represents a percentage actuation position of the actuating element,
- wherein the at least one sensor is configured to generate an actuating signal depending on the brake valve actuation travel of the actuating element, and
- wherein the at least one determination device is configured to generate the at least two useful sensor signals from the actuating signal depending on the at least two characteristic curves and/or dependences stored in the characteristic curve memory,
- wherein the at least one determination device is configured to generate the first useful sensor signal from the actuating signal depending on a brake valve pressure characteristic curve and/or a pressure-travel dependence stored in the characteristic curve memory and to generate the second useful sensor signal from the actuating signal depending on a brake valve position characteristic curve and/or a position dependence stored in the characteristic curve memory,
- wherein the at least one determination device is designed, by means of the stored brake valve pressure characteristic curve or the pressure-travel dependence, to assign the first useful sensor signal to the actuating signal, wherein the first useful sensor signal represents the controlled analog brake valve output pressure, and
- wherein the stored brake valve pressure characteristic curve and/or the pressure-travel dependence represent a non-linear relationship between the brake valve output pressure and the brake valve actuation travel and the stored brake valve position-characteristic curve and/or the stored brake valve position-travel dependency represent a linear relationship between the percentage actuation position and the brake valve actuation travel.

2. The brake valve as claimed in claim 1, wherein the at least one determination device is configured to produce the first useful sensor signal as a linear dependence of the brake valve output pressure on the brake valve actuation travel and to output the first useful sensor signal.

3. The brake valve as claimed in claim 1, wherein the at least one determination device is configured, via the stored brake valve position characteristic curve or the position-travel dependence, to assign the second useful sensor signal to the actuating signal, wherein the second useful sensor signal represents the percentage actuation position of the brake pedal.

4. The brake valve as claimed in claim 3, wherein the at least one determination device is configured to generate the second useful sensor signal as a linear dependence of the percentage actuation position on the brake valve actuation travel and to output the second useful sensor signal.

5. The brake valve as claimed in claim 1, wherein the at least one determination device is configured to generate the useful sensor signals by proportional variation of a signal width and to output the useful sensor signals.

6. The brake valve as claimed in claim 1, wherein the brake valve pressure characteristic curve or the pressure-travel dependence have at least two linear regions with different gradients, wherein the gradients are assigned to the spring stiffnesses of two springs of a spring device of the brake valve or the brake pedal or replicate a non-linear spring characteristic curve in linear sections.

7. The brake valve as claimed in claim 1, wherein the characteristic curves have fixed points or travel points as pairs of values for interpolation of the characteristic curves.

8. The brake valve as claimed in claim 1, wherein the brake valve has only one sensor and one determination device, wherein the at least one sensor is configured to generate the actuating signal depending on the brake valve actuation travel and to output it to the determination device and the only one determination device is configured to produce and output two different useful sensor signals from the one actuating signal depending on the at least two characteristic curves and/or dependences stored in the characteristic curve memory.

9. The brake valve as claimed in claim 1, wherein the brake valve has two sensors and two determination devices, wherein a first sensor is configured to generate a first actuating signal depending on the brake valve actuation travel and to output it to a first determination device and a second sensor is configured to output a second actuating signal to a second determination device,
- wherein the first determination device is configured to generate the first useful sensor signal from the first actuating signal depending on the characteristic curves and/or dependences stored in the characteristic curve memory and the second determination device is configured to generate the second useful sensor signal from the second actuating signal depending on the characteristic curves and/or dependences stored in the characteristic curve memory.

10. The brake valve as claimed in claim 1, wherein the characteristic curves and/or dependences stored in the characteristic curve memory are formed by calibration of the brake valve and measurement of the output brake valve output pressure and the percentage actuation position.

11. The brake valve as claimed in claim 1, wherein the at least one sensor is a travel sensor for determining the brake valve actuation travel of the actuating element with a working interconnection to the brake pedal for adjusting a passage cross-section of the brake valve.

12. A compressed air brake system for a commercial vehicle, the compressed air brake system comprising:
- a brake pedal;
- the brake valve as claimed in claim 1, the brake valve being configured to be controlled by the brake pedal;
- at least one brake circuit with at least one wheel brake and an ABS valve device;
- a brake pressure control line configured to convey or conduct the analog brake valve output pressure to the brake circuit; and
- a brake control device configured to receive the at least two useful sensor signals and configured to output control signals, wherein the useful sensor signals are configured to be output from the brake valve via an electrical control line.

13. A vehicle with a compressed air brake system as claimed in claim 12.

14. A method for calibrating the brake valve as claimed in claim 1, the method comprising:
- connecting the system pressure to the compressed air input and a pressure sensor to the compressed air output;
- successively adjusting an actuator, wherein the actuator acts on an actuation element of the brake valve;
- measuring multiple brake valve actuation travel values as actuating signals of the at least one sensor and determining, via the pressure sensor, brake valve output pressure values output by the brake valve at the compressed air output for the brake valve actuation travel values and percentage actuation position values of the actuating element specified by the actuator;
- forming a brake valve pressure characteristic curve and/or pressure-travel dependence from the brake valve actuation travel values and the brake valve output pressure values and storing, as one of the at least two characteristic curves and/or dependencies, the brake valve pressure characteristic curve and/or the pressure-travel dependence in the characteristic curve memory of the brake valve; and
- forming a second brake valve position characteristic curve and/or position-travel dependence from the brake valve actuation travel values and the percentage actuation position values and storing, as another of the at least two characteristic curves and/or dependencies, the second brake valve position characteristic curve and/or position-travel dependence in the characteristic curve memory of the brake valve.

15. The method as claimed in claim 14, wherein the two characteristic curves are stored as fixed points or travel points, wherein the fixed points or the travel points are formed as or from value tuples of the brake valve action travel values and the brake valve output pressure values or from the percentage actuation position values.

16. A brake valve for a compressed air brake system of a utility vehicle, wherein the brake valve can be actuated by a brake pedal and is provided for the output of an analog brake valve output pressure and of useful electrical sensor signals depending on the actuation of the brake pedal, the brake valve comprising:
- a compressed air input configured to connect to a system pressure;
- a compressed air output configured to connect a brake control line; and
- at least one sensor configured to determine a brake valve actuation travel of an actuating element of the brake valve with a working interconnection to the brake pedal;
- a characteristic curve memory storing two stored characteristic curves and/or dependences; and
- at least one determination device,
- wherein the brake valve is configured to output at least two useful sensor signals,
- wherein a first useful sensor signal represents a brake valve output pressure and a second useful sensor signal represents a percentage actuation position of the actuating element,
- wherein the at least one sensor is configured to generate an actuating signal depending on the brake valve actuation travel of the actuating element, and
- wherein the at least one determination device is configured to generate the at least two useful sensor signals from the actuating signal depending on the at least two characteristic curves and/or dependences stored in the characteristic curve memory,
- wherein the at least one determination device is configured to generate the first useful sensor signal from the actuating signal depending on a brake valve pressure characteristic curve and/or a pressure-travel dependence stored in the characteristic curve memory and to generate the second useful sensor signal from the actuating signal depending on a brake valve position characteristic curve and/or a position dependence stored in the characteristic curve memory,
- wherein the at least one determination device is designed, by means of the stored brake valve pressure characteristic curve or the pressure-travel dependence, to assign the first useful sensor signal to the actuating signal, wherein the first useful sensor signal represents the controlled analog brake valve output pressure, and
- wherein the at least one determination device is configured to generate the useful sensor signals by proportional variation of a signal width and to output the useful sensor signals.

17. A brake valve for a compressed air brake system of a utility vehicle, wherein the brake valve can be actuated by a brake pedal and is provided for the output of an analog brake valve output pressure and of useful electrical sensor signals depending on the actuation of the brake pedal, the brake valve comprising:
- a compressed air input configured to connect to a system pressure;
- a compressed air output configured to connect a brake control line; and
- at least one sensor configured to determine a brake valve actuation travel of an actuating element of the brake valve with a working interconnection to the brake pedal;
- a characteristic curve memory storing two stored characteristic curves and/or dependences; and
- at least one determination device,
- wherein the brake valve is configured to output at least two useful sensor signals,
- wherein a first useful sensor signal represents a brake valve output pressure and a second useful sensor signal represents a percentage actuation position of the actuating element,
- wherein the at least one sensor is configured to generate an actuating signal depending on the brake valve actuation travel of the actuating element,
- wherein the at least one determination device is configured to generate the at least two useful sensor signals from the actuating signal depending on the at least two characteristic curves and/or dependences stored in the characteristic curve memory,
- wherein the brake valve has two sensors and two determination devices, wherein a first sensor is configured to generate a first actuating signal depending on the brake valve actuation travel and to output it to a first determination device and a second sensor is configured to output a second actuating signal to a second determination device,
- wherein the first determination device is configured to generate the first useful sensor signal from the first actuating signal depending on the characteristic curves and/or dependences stored in the characteristic curve memory and the second determination device is configured to generate the second useful sensor signal from the second actuating signal depending on the characteristic curves and/or dependences stored in the characteristic curve memory.

* * * * *